(12) United States Patent
Kant et al.

(10) Patent No.: US 11,076,296 B1
(45) Date of Patent: Jul. 27, 2021

(54) SUBSCRIBER IDENTITY MODULE (SIM) APPLICATION AUTHENTICATION

(71) Applicant: Sprint Communications Company L.P., Overland Park, KS (US)

(72) Inventors: Nishi Kant, Fremont, CA (US); Lyle W. Paczkowski, Mission Hills, KS (US); Ivo Rook, New York, NY (US)

(73) Assignee: Sprint Communications Company L.P., Overland Park, KS (US)

(*) Notice: Subject to any disclaimer, the term of this patent is extended or adjusted under 35 U.S.C. 154(b) by 244 days.

(21) Appl. No.: 16/411,134

(22) Filed: May 13, 2019

(51) Int. Cl.
- *H04W 12/37* (2021.01)
- *H04W 12/041* (2021.01)
- *H04W 12/06* (2021.01)
- *H04W 8/18* (2009.01)
- *H04L 29/06* (2006.01)

(52) U.S. Cl.
CPC ......... *H04W 12/37* (2021.01); *H04L 63/0853* (2013.01); *H04L 63/0892* (2013.01); *H04W 8/183* (2013.01); *H04W 12/041* (2021.01); *H04W 12/06* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,611,536 B2* | 12/2013 | Semple | ................. | H04W 12/04 380/270 |
| 9,716,999 B2* | 7/2017 | Zhang | ................. | H04W 12/069 |
| 10,659,447 B2* | 5/2020 | Naslund | ................. | H04L 9/3271 |
| 2014/0165170 A1* | 6/2014 | Dmitriev | ................. | H04L 63/168 726/7 |
| 2014/0171029 A1* | 6/2014 | Holtmanns | ........... | H04W 12/06 455/411 |
| 2016/0226861 A1* | 8/2016 | Takae | ................. | H04W 52/0245 |
| 2018/0020351 A1* | 1/2018 | Lee | ..................... | H04L 63/0876 |

OTHER PUBLICATIONS

Yousif Targali, Vinod Choyi, Yogendra Shah "Seamless Authentication and Mobility Across Heterogeneous Networks using Federated Identity Systems", IEEE International Conference on Communications, 2013, pp. 1232-1237. (Year: 2013).*

* cited by examiner

*Primary Examiner* — Catherine Thiaw

(57) ABSTRACT

A method of authenticating access of an electronic device to an application server based on a subscriber identity module (SIM) associated with the electronic device. The method receiving an authentication challenge from an application executing on the device by a SIM application toolkit (SAT) executing on the device, transmitting a random number and an authentication value of the challenge to a SIM of the device by the SAT, receiving a response from the SIM by the SAT, transmitting an authentication response to the application by the SAT, where the authentication response comprises the response received from the SIM, generating an application key by the SAT based at least in part on the response received from the SIM, and transmitting the application key to the application by the SAT, whereby the application executing on the electronic device establishes a communication session with an application server via an access communication network.

20 Claims, 11 Drawing Sheets

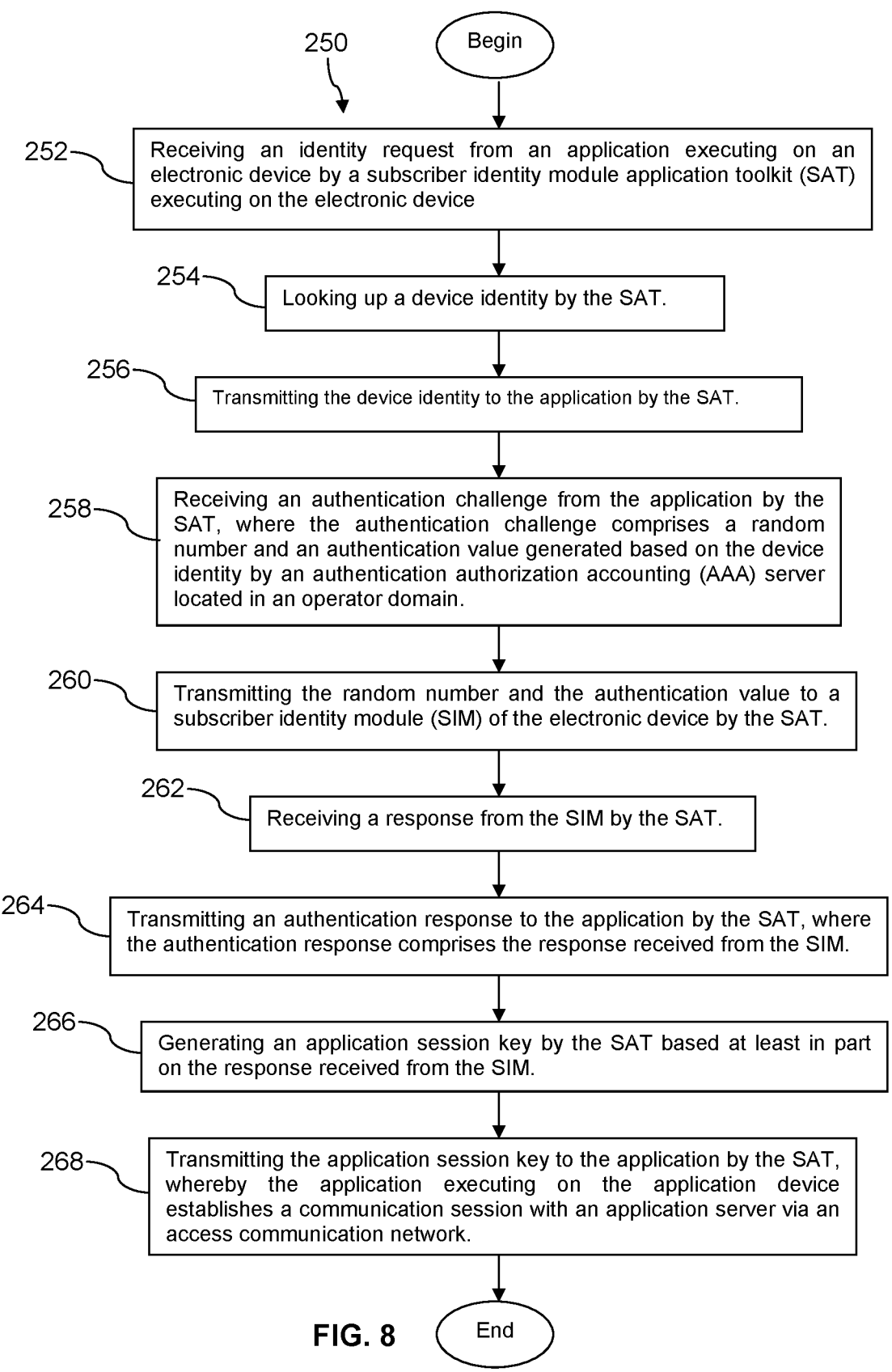

SUBSCRIBER IDENTITY MODULE (SIM) APPLICATION AUTHENTICATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Electronic communications may take a variety of forms and pass through a variety of network domains. Access to communication networks may be provided to an electronic device by an access domain. The electronic device may communicate with a service domain to obtain services from an application server. Each of the different domains into which the electronic device communicates may desire to authenticate the electronic device. Authentication is typically conducted on the basis of identifying information and unique keys. In some cases, electronic devices may attempt to gain access to a network domain fraudulently, for example by presenting identifying information and unique keys associated with a different device.

SUMMARY

In an embodiment, a method of authenticating access of an electronic device to an application server based on a subscriber identity module (SIM) associated with the electronic device is disclosed. The method comprises receiving an identity request from an application executing on an electronic device by a subscriber identity module application toolkit (SAT) executing on the electronic device, looking up a device identity by the SAT, and transmitting the device identity to the application by the SAT. The method further comprises receiving an authentication challenge from the application by the SAT, where the authentication challenge comprises a random number and an authentication value generated based on the device identity by an authentication authorization accounting (AAA) server located in an operator domain, transmitting the random number and the authentication value to a subscriber identity module (SIM) of the electronic device by the SAT, and receiving a response from the SIM by the SAT. The method further comprises transmitting an authentication response to the application by the SAT, where the authentication response comprises the response received from the SIM, generating an application session key by the SAT based at least in part on the response received from the SIM, and transmitting the application session key to the application by the SAT, whereby the application executing on the electronic device establishes a communication session with an application server via an access communication network.

In another embodiment, an electronic device is disclosed. The electronic device comprises a communication interface, a subscriber identity module (SIM), an application stored in a non-transitory memory of the electronic device, and a SIM application toolkit stored in a non-transitory memory of the electronic device. When executed by a processor of the electronic device, the application authenticates into an access communication network and authenticates into an application service domain via the communication interface. When executed by a processor of the electronic device, the SIM application toolkit receives an identity request from the application, wherein the identity request is associated with the application authenticating into the access network, looks up a device identity, transmits the device identity to the application, receives an authentication challenge from the application, wherein the authentication challenge comprises a random number and an authentication value generated based on the device identity by an authentication authorization accounting (AAA) server located in an operator domain and wherein the authentication challenge is associated with the application authenticating into the access network, transmits the random number and the authentication value to the SIM, receives a response from the SIM, transmits an authentication response to the application, where the authentication response comprises the response received from the SIM, generates an application session key based at least in part on the response received from the SIM, and transmits the application session key to the application, whereby the application authenticates into the application service domain and establishes a communication session with an application server in the application service domain via the communication interface.

In yet another embodiment, a method of authenticating access of an electronic device into a communication access network based on a subscriber identity module (SIM) associated with the electronic device is disclosed. The method comprises receiving a first identity request from a first application executing on an electronic device by a subscriber identity module application toolkit (SAT) executing on the electronic device, wherein the first application is associated with a first sensor, looking up a device identity by the SAT, transmitting the device identity to the first application by the SAT, and receiving a first authentication challenge from the first application by the SAT, where the first authentication challenge comprises a first random number and a first authentication value generated based on the device identity by an authentication authorization accounting (AAA) server located in an operator domain. The method further comprises transmitting the first random number and the first authentication value to a subscriber identity module (SIM) of the electronic device by the SAT, receiving a first response from the SIM by the SAT; and transmitting a first authentication response to the first application by the SAT, wherein the first authentication response comprises the first response received from the SIM, whereby the first application authenticates into a first communication access network based in part on the first authentication response. The method further comprises receiving a second identity request from a second application executing on the electronic device by the SAT, wherein the second application is associated with a second sensor, transmitting the device identity to the second application by the SAT, and receiving a second authentication challenge from the second application by the SAT, where the second authentication challenge comprises a second random number and a second authentication value generated based on the device identity by the AAA server. The method further comprises transmitting the second random number and the second authentication value to the SIM of the electronic device by the SAT, receiving a second response from the SIM by the SAT, and transmitting a second authentication response to the second application by the SAT, wherein the second authentication response comprises the second response received from the SIM, whereby the second application authenticates into a second communication access network based in part on the second authentication response.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 8 is a flow chart of a method according to an embodiment of the disclosure.

DETAILED DESCRIPTION

Figure 1:
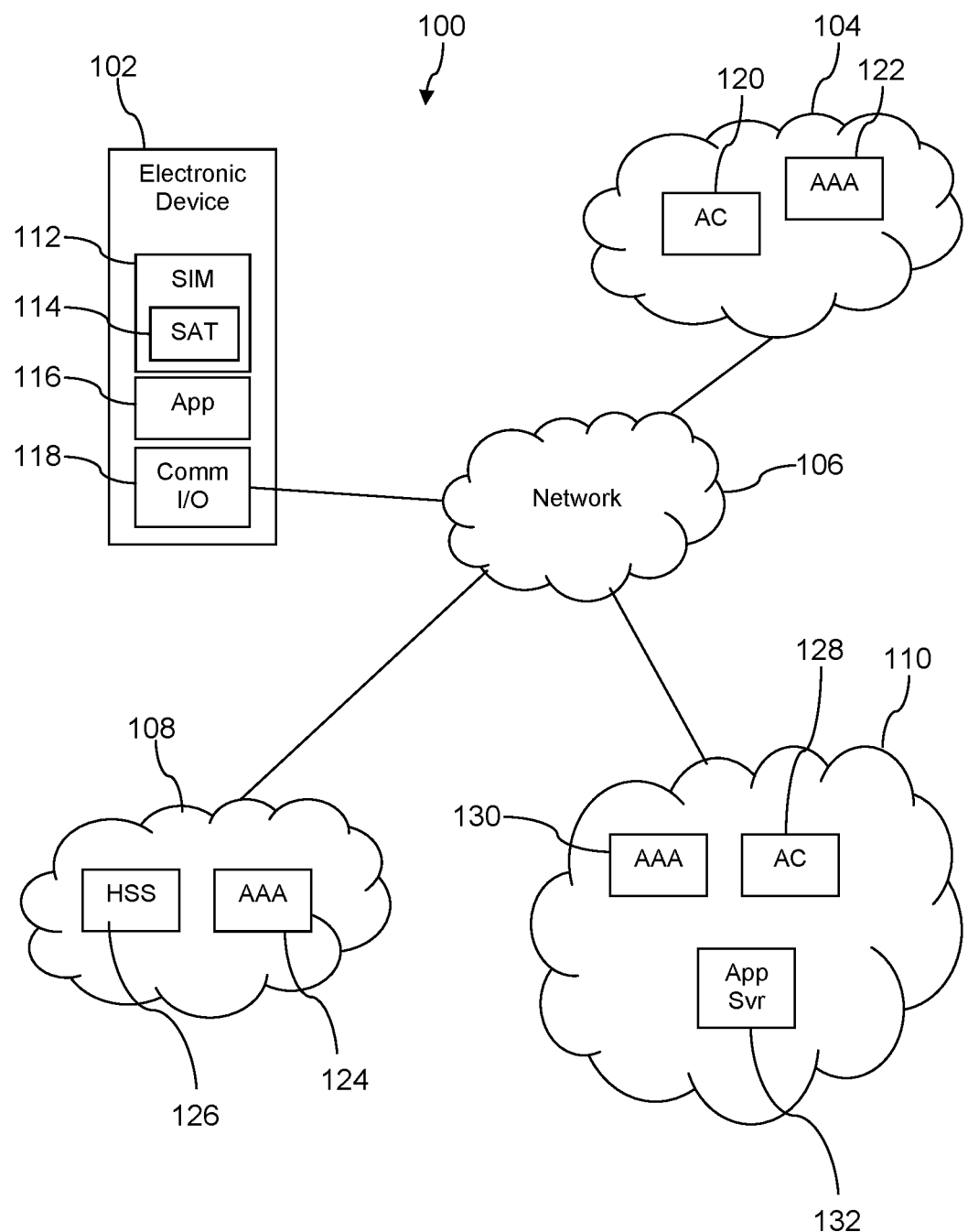
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Traditional subscriber identity modules (SIMs) are smart cards that may be inserted into and removed from mobile communication devices such as cell phones or mobile phones by users. These SIMs can provide authentication credentials for attaching to a radio access network (RAN) of a cellular wireless communication network. In some sense, SIMs may provide an identity to a mobile phone. For example, a user may insert his or her SIM into a first cell phone to enable the phone to attach to the RAN using a subscription account associated with that user. If the user removes the SIM from the first cell phone and inserts the SIM into a second cell phone, the second cell phone may be enabled to attach to the RAN using the subscription account of that user. If a second SIM associated with a second user is then inserted into the first cell phone, the first cell phone may then be enabled to attach to the RAN using a subscription account of the second user.

The traditional SIM has lately been re-conceptualized in various ways. In an embodiment, the role of the traditional SIM of authenticating into the cellular RAN may be embodied in a universal integrated circuit card (UICC), for example in 3G and 4G cellular networks. In an embodiment, an embedded SIM (eSIM) that is permanently installed in a mobile communication device (e.g., is not removable by a lay person without damaging the mobile communication device) may provide authentication into the cellular RAN.

The Internet of things (IoT) is projected to be a strong technology growth area in the future. One of the challenges of an IoT build-out, however, is electronic security. How is security provided to prevent various forms of electronic fraud? For example, how are IoT devices authenticated for communication access to one or more network domains when the access is provided over a non-cellular wireless communication link? The present disclosure teaches adapting a SIM or eSIM for use in authenticating an IoT device and/or other electronic devices into various communication network domains. Because it may be undesirable to impose new functional requirements on existing SIMs and/or eSIMs, the present disclosure teaches a new SIM application toolkit (SAT) which provides new functionality for authentication operations using the SIM/eSIM and adapts between the SIM/eSIM and IoT device applications and/or electronic device applications. The SAT with this new functionality may be embedded in the SIM without changing the hardware structure or functional behavior of the rest of the SIM. Alternatively, the SAT with this new functionality may be stored in a non-transitory memory outside of the SIM and executed on a processor outside of the SIM. While IoT devices are used as an example use case in the present disclosure, it is understood that the teachings of the present disclosure may advantageously be applied to other use cases not involving IoT devices and instead involving more fully functional electronic devices.

IoT devices typically may be low-cost, relatively simple electronic devices. These attributes are consistent with deploying a large number of IoT devices as is projected. A security strategy that relies upon storing an identity and a secret (e.g., a password) in an IoT device may be vulnerable to hacking, for example vulnerable to identity theft. The present disclosure teaches providing a SIM or an eSIM in the IoT device and mediating access to the security credentials stored in the SIM or eSIM by a SAT which restricts access and deters hacking and exposure of the security credentials stored in the SIM or eSIM. For convenience sake, the disclosure may refer hereinafter to a SIM, but it is understood that a variety of alternative embodiments providing the functionality of a SIM are equally contemplated for use with the teachings of the disclosure, for example an embedded SIM (eSIM) and/or a UICC.

The IoT device may comprise a sensor and an IoT device application that collects sensor data and transmits the data to an application server in an IoT service domain. When the IoT device boots, the IoT device application may attempt to establish a data session with an IoT service domain. As taught herein, the IoT application requests a globally unique identity or identifier from a SIM application toolkit (SAT) that executes on the IoT device, for example a SAT that executes on the SIM itself or that executes on a processor of the IoT device outside of the SIM. The SAT looks up the globally unique identity of the IoT device and returns it to the IoT application. The globally unique identity of the IoT device may be associated with an enterprise that has a proprietary stake in the SIM of the IoT device, for example a wireless communication service provider. The IoT application requests communication access from an access domain, sending the globally unique identity to the access domain. An access controller in the access domain requests authentication of the IoT device by an authentication, authorization, accounting (AAA) server in the access domain, providing the globally unique identity to the access domain AAA server. The access domain AAA server determines an operator domain associated with the globally unique identity (e.g., a wireless communication service provider) and forwards an authentication request containing the globally unique identity to an operator domain AAA server in the operator domain.

The operator domain AAA server provides the globally unique identity to a home subscriber server (HSS), and the HSS looks-up the globally unique identity. If the HSS validates that the globally unique identity is known to it (e.g., is associated with a SIM which the operator domain supports), it generates an authentication vector and returns this to the operator domain AAA server. The HSS generates the authentication vector in part based on shared secret data retained by the HSS and retained by the SIM. The operator domain AAA server generates a challenge based on the authentication vector and returns that challenge to the access domain. The access domain propagates the challenge to the IoT application. The IoT application propagates the challenge to the SAT. The SAT propagates the challenge to the SIM.

The SIM parses the challenge into a random number field and into an authentication value. The random number (RAND) and the authentication value (AUTN) are separate parameters in an authentication vector contained by the challenge. The SIM verifies that the authentication value is known to it (e.g., is associated with the operator domain to which the SIM is affiliated). Said in other words, the authentication value allows the SIM to confirm that the challenge message came from a valid network that has access to its corresponding HSS that shares a secret with the SIM. The SIM then generates a challenge response based on the random number received in the challenge and based on shared secret data retained by the SIM. The SIM returns the challenge response to the SAT. The SAT propagates the challenge response to the IoT application. The IoT application propagates the challenge response to the access domain, and the access domain propagates the challenge response to the operator domain AAA server.

The operator domain AAA server validates the challenge response and generates an access key based on the shared secret data. The operator domain AAA server returns an authentication success message and the access key to the access domain. The SIM may generate the same access key based on the shared secret data and provide this access key to the SAT. Thereafter the SAT can provide the access key to the IoT application as needed to respond to access key challenges issued by the access domain to the IoT application. In an embodiment, the SIM may generate the same Ck, Ik that the HSS generated when it created the authentication vectors sent in the challenge message. In an embodiment, the SIM calculates an expected result value XRes which it attempts to match with a RES provided in the authentication vector. In an embodiment, matching XRes with Res allows authentication to succeed, and matching Cd, Ik allows the SAT to compute a common session key (MSK) used by the operator AAA server.

It is noted that the shared secret data is known only to the SIM and to the operator domain. The session key may be aged out by security policy enforced by the access domain, and in this case the IoT application may repeat the process described above. The access key may be stored by the SAT in transitory memory (e.g., in an embodiment in which the SAT is not embedded in the SIM itself), and hence when the IoT device is powered down and powered up, the access authentication procedure described above may be repeated.

In an embodiment, the communication between the IoT device and the access domain is conducted via a non-cellular communication link. The IoT device and the access domain may communicate using a WiFi link, a Bluetooth® link, an Ethernet link, or some other non-cellular communication link.

Once granted access by the access domain, the IoT application may request access to a service domain, for example to promulgate sensor data to a sensor data application server in the service domain. This may call for authentication of the IoT device by the service domain (e.g., application level authentication or layer 7 authentication). The IoT application requests a service connection to the service domain and provides the globally unique identity (e.g., the IoT application requests the globally unique identity from the SAT). A service domain AAA server identifies the operator domain based on the globally unique identity and sends a request for service session keys to the operator domain AAA server. The operator domain AAA server generates a session key based on the shared secret data and returns the session key to the service domain AAA server. The session key may be generated based on a universal resource identifier (URI) of an application server in the service domain. The SAT may request a session key based on the application server URI from the SIM. The SIM, having access to the shared secret data, is able to generate the same session key that was returned to the service domain AAA server (e.g., a session key having the same value as the session key returned to the service domain AAA server). It is noted that this service domain authentication comprises using the SIM, mediated by the SAT, to perform layer 7 (application layer) authentication.

The derived keys, for example the access key and the session key, may be hacked by cyber criminals by hacking into the transitory memory of the IoT device. But this risk can be mitigated by aging out the derived keys periodically. By storing the shared data only in the end points—in the operator domain HSS and in the SIM—the bar for hacking the shared secret data is raised rather high. This solution leverages existing capabilities of SIMs in a cost effective and secure manner to secure IoT devices and IoT application sessions in a light-weight manner. This disclosure teaches a practical solution for a specific computer challenge—providing information security in IoT devices—applied to a specific subset of embodiments, specifically the information security challenge of identifying, authenticating, and authorizing access of the IoT devices for communication across several independent domains. The use of the SAT taught herein to leverage the traditional SIM functionality for use in authenticating and authorizing access in these separate domains is distinct from and unsuggested by traditional SAT implementations. Additionally, these teachings may also be advantageously applied to other devices that are not IoT devices.

Turning now to FIG. 1, a system 100 is described. In an embodiment, system 100 comprises an electronic device 102, an access domain 104, a network 106, an operator domain 108, and a service domain 110. In an embodiment, the network 106 comprises one or more private networks, one or more public networks, or a combination thereof. The access domain 104, the operator domain 108, and the service domain 110 may be considered part of the network 106 but are illustrated separately in FIG. 1 to bring out operational details of the present disclosure. In an embodiment, the electronic device 102 is an IoT device. In another embodiment, the electronic device 102 is a mobile communication device such as a mobile phone, a smart phone, a wearable computer, a laptop computer, a notebook computer, or a tablet computer. The electronic device 102 comprises a SIM 112, a SIM application toolkit (SAT) 114, an application 116, and a communication interface 118. In an embodiment, the SAT 114 is embedded in the SIM 112 itself. In another embodiment, the SAT 114 is an application that is stored in a memory of the electronic device 102 and is executed by a processor of the electronic device 102. While a single electronic device 102 is illustrated in FIG. 1, it is understood that the system 100 may comprise any number of electronic devices 102 and that the system 100 may comprise a mixture of electronic devices 102 that are of different types. For example, the system 100 may comprise 10 million IoT devices, 5 million smart phones, 200 thousand laptop computers, 200 thousand notebook computers, 200 thousand tablet computers, and 100 thousand wearable computers.

The access domain 104 comprises a first access controller 120 and a first authentication, authorization, and accounting (AAA) server 122. In an embodiment, the access domain 104 comprises any number of access controllers 120 and any number of AAA servers 122. The operator domain 108 comprises a second AAA server 124 and a home subscriber server (HSS) 126. In an embodiment, the operator domain 108 comprises any number of AAA servers 124 and any number of HSSs 126. The service domain 110 comprises a second access controller 128, a third AAA server 130, and an application server 132. In an embodiment, the service domain 110 comprises any number of access controllers 128, any number of AAA servers 130, and any number of application servers 132.

In an embodiment, the system 100 comprises any number of access domains 104, any number of operator domains, and any number of service domains 110. Different access domains 104 may be provided by different local communication service companies. Different operator domains may be provided by different major communication companies such as AT&T, Verizon, and Sprint. Different service domains may be provided by other companies.

In operation, the electronic device 102 may request connectivity to the network 106 via the access domain 104. To authenticate the electronic device 102, the access domain may request authentication of the device 102 from the operator domain 108. When the electronic device 102 is provided access to the network 106 by the access domain 104, the application 116 may request an application session with the service domain 110. To authenticate the electronic device 102 (e.g., application layer authentication or layer 7 authentication), the service domain 110 may request authentication of the device 102 from the operator domain 108. Further details of device access authentication and application authentication are described hereinafter.

It is contemplated that the electronic device 102 may be implemented in a variety of different ways.

Figure 2:
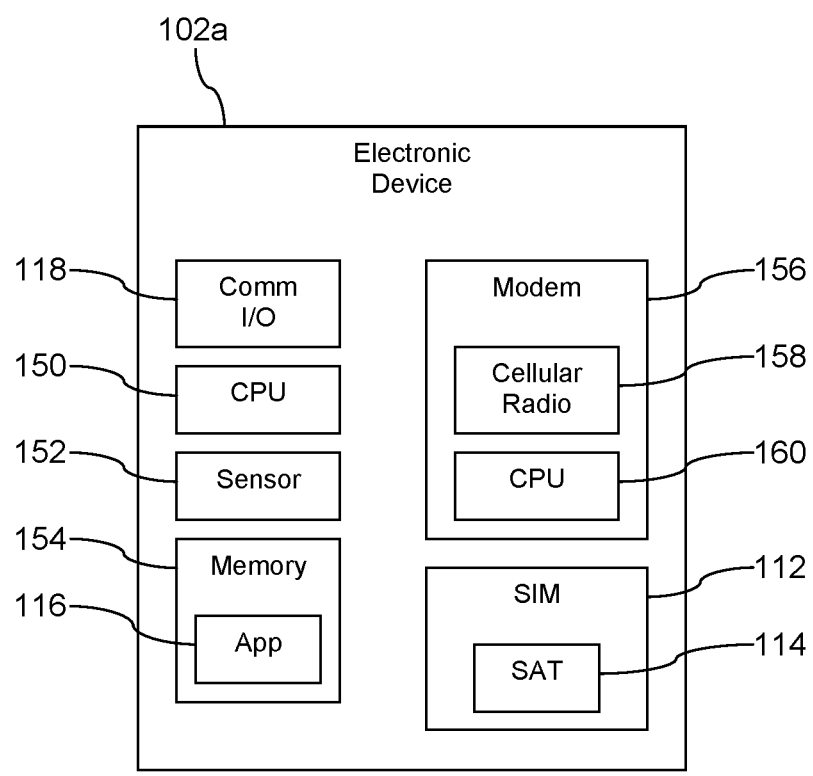
FIG. 2 is a block diagram of an electronic device according to an embodiment of the disclosure.

Turning now to FIG. 2, a first electronic device 102a is described. The first electronic device 102a comprises the SAT 114, the SIM 112, the application 116, and the communication interface 118. The first electronic device 102a further comprises a first processor 150, a sensor 152, a first memory 154 that stores the application 116, and a modem 156. The modem 156 comprises a cellular radio transceiver 158 and a second processor 160. In some contexts the modem 156 may be referred to as a cellular radio modem. The application 116 may be stored in a non-transitory portion of the first memory 154. In an embodiment, the SAT 114 is embedded within the SIM 112. In another embodiment, the SAT 114 may be stored in a non-transitory portion of a second memory of the modem 156 and executed by the processor 160. The application 116 may be executed by the first processor 150. The SAT 114 may be executed by the SIM 112 or by the second processor 160. The sensor 152 may be a temperature sensor, a humidity sensor, a magnetic sensor, a pressure sensor, a gas detection sensor, a flow sensor, or another sensor. The application 116 is associated with the sensor 152 and reports data collected from the sensor 152 back to the application server 132 in the service domain 110. In an embodiment, the application 116 sends raw sensor data to the application server 132. In an embodiment, the application 116 may process or summarize the data before sending the sensor data to the application server 132. For example, the application 116 may convert raw data into an equivalent standard unit—for example convert a 13.7 mV sensed value to 0 degrees Celsius. For example, the application 116 may determine an average sensor data value over an interval of time, collect a series of average sensor data values, and send a day's worth series of average sensor data values to the application server 132. The communication interface 118 may provide communication to the access domain 104 via a wireless communication link or a wired link. The communication interface 118 may provide communication via a WiFi wireless link, via a Bluetooth® wireless link, via an Ethernet wired link, via a power line communication (PLC) wired link, or via some other non-cellular communication link.

Figure 3:
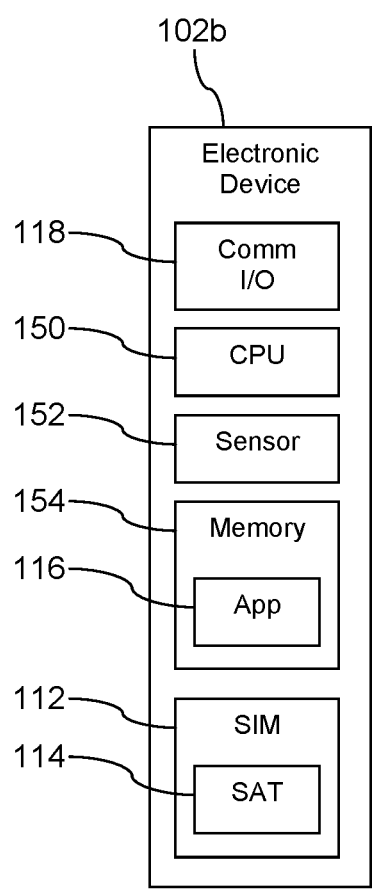
FIG. 3 is a block diagram of another electronic device according to an embodiment of the disclosure.

Turning now to FIG. 3, a second electronic device 102b is described. The second electronic device 102b comprises the SIM 112, the SAT 114, the application 116, and the communication interface 118. The second electronic device 102b further comprises the first processor 150, the sensor 152, and the first memory 154. In an embodiment, the SAT 114 may be stored in a non-transitory portion of the first memory 154 and executed by the processor 150. The application 116 may be stored in a non-transitory portion of the first memory 154. When the SAT 114 is embedded in the SIM 112, the SAT 114 executes on the SIM 112. In an alternative embodiment, the application 116 and the SAT 114 may both be executed by the first processor 150, for example in a context switching mode of execution. The application 116 is associated with the sensor 152 and reports data collected from the sensor 152 back to the application server 132 in the service domain 110. The communication interface 118 and the sensor 152 of FIG. 3 may be substantially similar to the corresponding components of FIG. 2.

Figure 4:
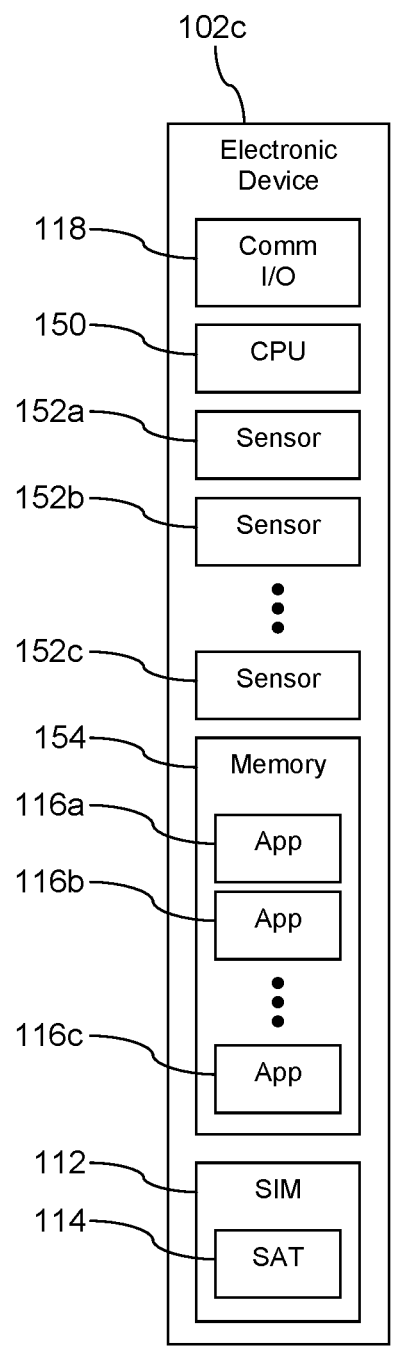
FIG. 4 is a block diagram of yet another electronic device according to an embodiment of the disclosure.

Turning now to FIG. 4, a third electronic device 102c is described. The third electronic device comprises the SIM 112, the SAT 114, the communication interface 118, the first processor 150, and the first memory 154. In an alternative embodiment, the SAT 114 is stored in the first memory 154. The third electronic device 102c further comprises a first sensor 152a, a second sensor 152b, and a third sensor 152c. The third electronic device 102c further comprises a first application 116a, a second application 116b, and a third application 116c that are stored in the first memory 154. In an embodiment, the SAT 114, the first application 116a, the second application 116b, and the third application 116c are stored in a non-transitory portion of the first memory 154. The first application 116a is associated with the first sensor 152a and reports data collected from the first sensor 152a back to a first application server in the service domain 110. The second application 116b is associated with the second sensor 152b and reports data collected from the second sensor 152b back to a second application server in the service domain 110. The third application 116c is associated with the third sensor 152c and reports data collected from the third sensor 152c back to a third application server in the service domain 110. In an embodiment, two or more of the applications 116 may report data collected from their corresponding sensors 152 back to the same application server 132 in the service domain 110. In an embodiment, the third electronic device 102c may comprise any number of sensors and a corresponding number of applications (e.g., a one-to-one numerical relationship between sensors and applications). In an embodiment, the applications 116 and the sensors 152 do not maintain a one-to-one numerical relationship, and at least one of the applications 116 is associated with two or more sensors 152 and reports data from the two or more sensors 152 back to a single application server 132 in the service domain 110.

Figure 5:
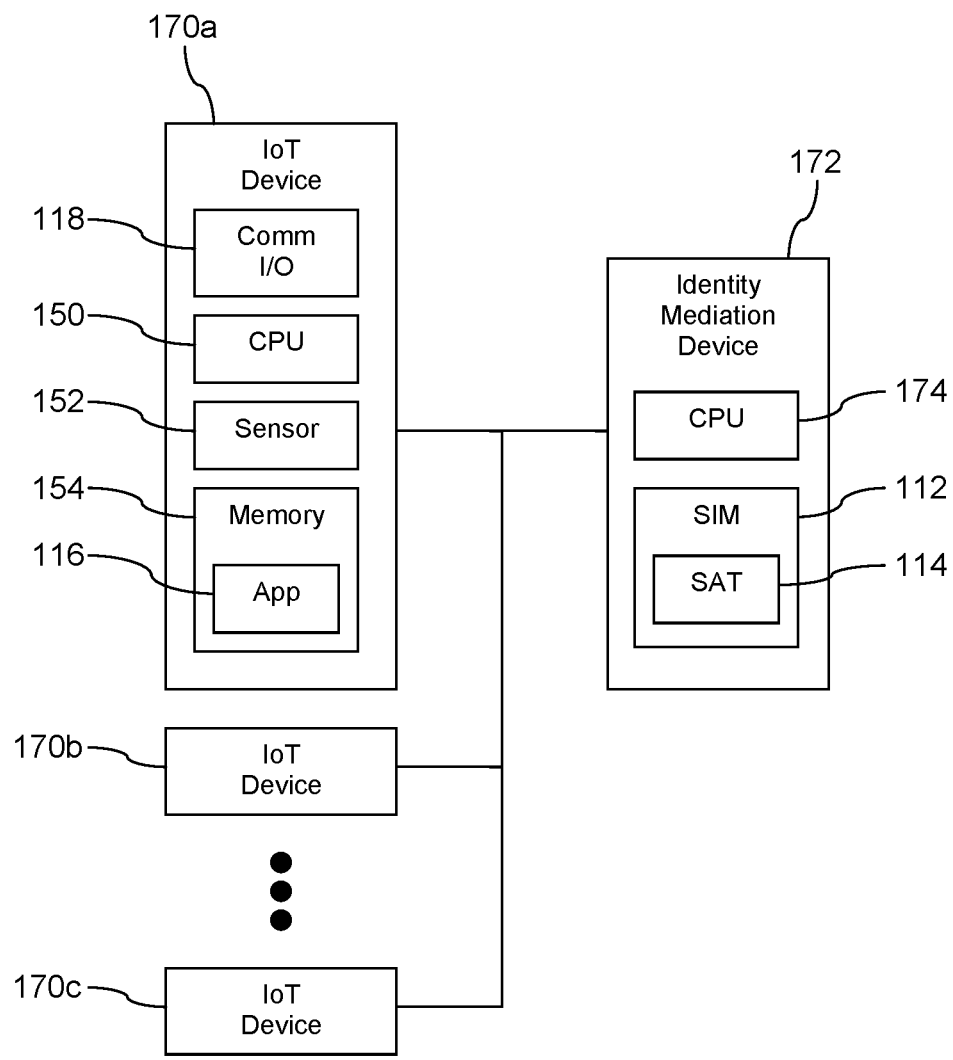
FIG. 5 is a block diagram of a system according to an embodiment of the disclosure.

Turning now to FIG. 5, a plurality of IoT devices 170 associated with an identity mediation device 172 are described. The IoT devices 170 comprise a first IoT device 170a, a second IoT device 170b, and a third IoT device 170c. It is understood that the present disclosure contemplates any number of IoT devices 170 associated to a single identity mediation device 172. The IoT devices 170 may each comprise the communications interface 118, the first processor 150, the sensor 152, the first memory 154, and the application 116. The identity mediation device 172 may comprise a third processor 174 and the SIM 112 that comprises the embedded SAT 114. In an alternative embodiment, the SAT 114 is stored in a non-transitory portion of memory of the identity mediation device 172 and executed by the processor 174. The IoT devices 170 may be communicatively coupled to the identity mediation device 172.

Figure 6:
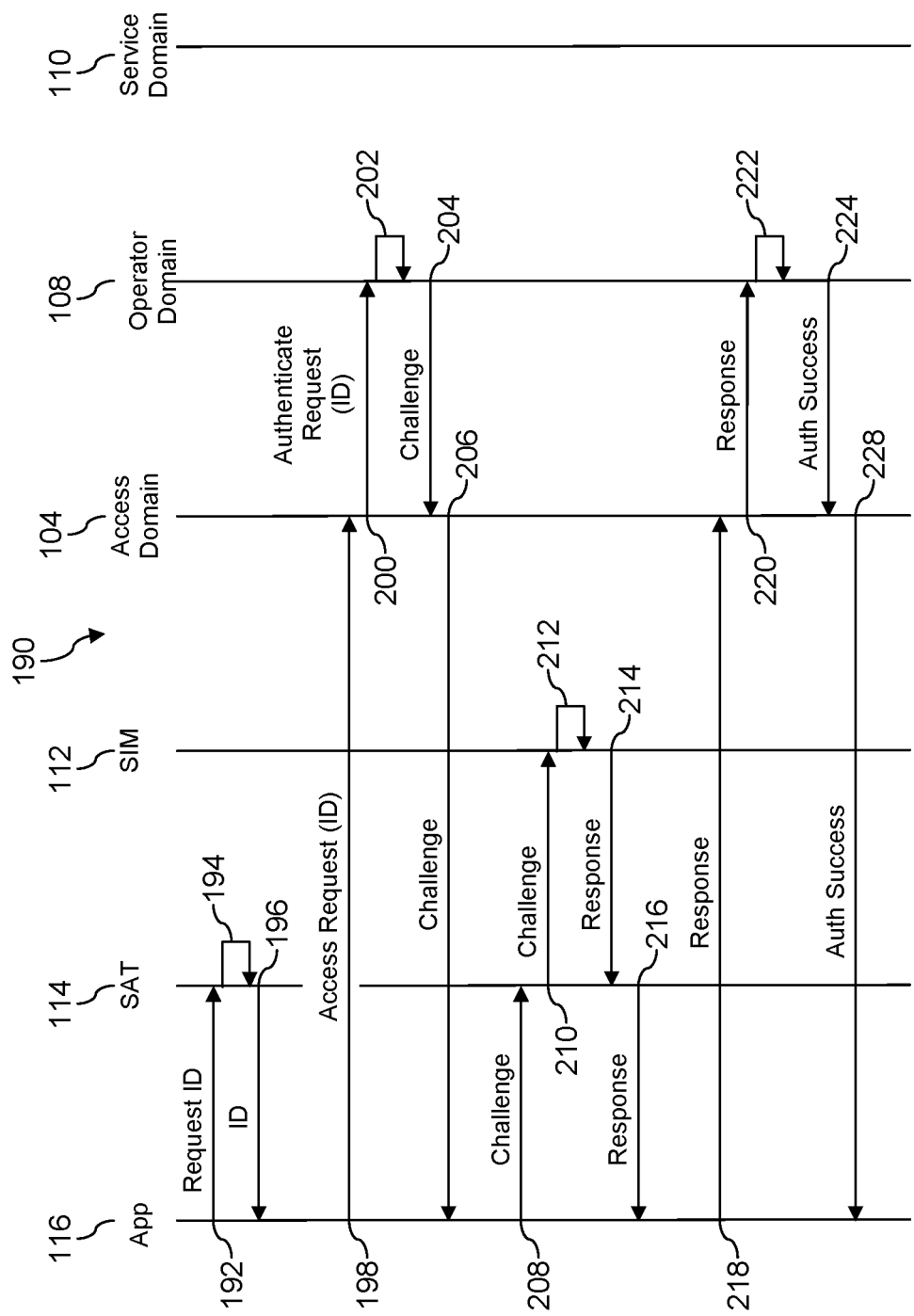
FIG. 6 is a message sequence diagram of an authentication process according to an embodiment of the disclosure.
Figure 7:
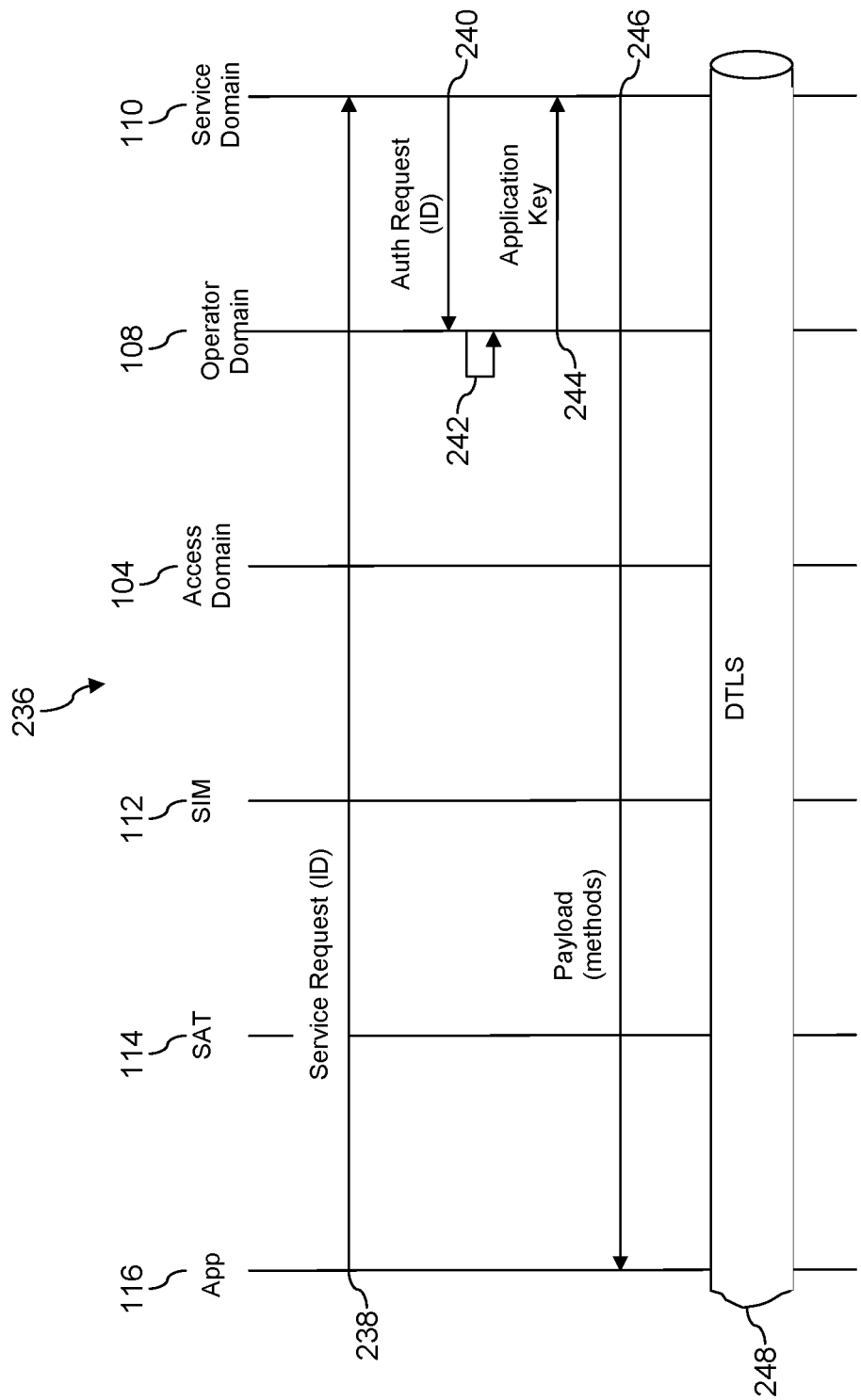
FIG. 7 is a message sequence diagram of another authentication process according to an embodiment of the disclosure.

Turning now to FIG. 6, a message sequence 190 is described. It is observed that the message sequence 190 and message sequence 236 of FIG. 7 are applicable to any of the electronic devices 102a, 102b, and 102c and applicable to the IoT devices 170a, 170b, 170c and the identity mediation device 172. More specifically, the SIM 112, the SAT 114, and the application 116 that figure in these message sequences 190, 236 may be associated with (A) the first electronic device 102a, (B) the second electronic device 102b, (C) the third electronic device 102c, or (D) the IoT devices 170a, 170b, 170c and the identity mediation device 172. The message sequence 190 relates to authentication of the electronic device 102 or the IoT device 170 into the access domain 104 for access to the network 106 and may be referred to as network level authentication or layer 3 authentication. In an embodiment, the network level authentication is based on the extensible authentication protocol (EAP).

At label 192, the application 116 requests a globally unique identity from the SAT 114. The application 116 may do this pursuant to the application 116 being launched or initiated, for example during a power on boot of the electronic device 102 or of the IoT device 170. At label 194, the SAT 114 looks up a globally unique identity associated with the SIM 112. The SAT 114 may generate a globally unique identity based on requesting this identity from the SIM 112. In an embodiment, the globally unique identity associated with the SIM 112 may change over the life of the SIM 112, for example when the proprietary stake or interest in the SIM 112 is transferred from a first enterprise (e.g., a wireless communication service provider) to a second enterprise (e.g., a cloud computing service provider). The SIM 112 may be pre-configured with a plurality of different identities at manufacturing time, whereby to support the transfer of proprietary interest in the SIM 112 from a first enterprise to a second enterprise. At label 196, the SAT 114 transmits a globally unique identity associated with the SAT 114 and/or the SIM 112 to the application 116.

At label 198, the application 116 requests access to the network 106 from the access domain 104. The processing of label 198 may comprise the application 116 sending an access request message containing the globally unique identity to the access controller 120 in the access domain 104. At label 200, the access domain 104 sends an authentication request comprising the globally unique identity to the operator domain 108. The processing of label 200 may comprise the access controller 120 requesting the access domain AAA 122 to authenticate the electronic device 102 or the IoT device 170 based on the globally unique identity. The access domain AAA 122 can identify the operator domain 108 associated with the globally unique identity and sends the authentication request to the operator domain AAA 124.

At label 202, the operator domain 108 processes the globally unique identity to generate an authentication challenge. The processing of label 202 may comprise the operator domain AAA 124 requesting the HSS 126 to verify the globally unique identity. The HSS 126 may determine that the operator domain is affiliated with the globally unique identity (e.g., has a proprietary relationship to the SIM 112, for example maintains a communication subscription account for the SIM 112). The HSS 126 may generate an authentication vector comprising a plurality of authentication values and provide this authentication vector to the operator domain 108. In an embodiment, the authentication vector comprises a random number, a Ck value, an Ik value, a response value, and an authentication value. The operator domain 108 generates the authentication challenge that contains the random number and the authentication value of the authentication vector received from the HSS 126.

At label 204, the operator domain 108 sends the authentication challenge to the access domain 104. The processing of label 204 may comprise the operator domain 108 sending the authentication challenge to the access domain AAA 122, and the access domain AAA 122 sending the authentication challenge to the access controller 120. At label 206, the access domain 104 sends the authentication challenge to the application 116, for example the access controller 120 sends the authentication challenge to the electronic device 102 or to the IoT device 170. At label 208, the application sends the authentication challenge to the SAT 114.

At label 210, the SAT 114 sends the authentication challenge to the SIM 112. At label 212, the SIM 112 processes the authentication challenge. As part of the processing at label 212, the SIM 112 may confirm that the authentication value contained in the authentication challenge is associated to the operator domain 108 to which it is affiliated. If the SIM 112 deems the authentication value valid, it generates a challenge response based on the random number value received in the authentication challenge and based on a shared secret key stored by the SIM 112 and stored by the operator domain 108 (e.g., stored by the operator domain 108 or the HSS 126).

At label 214, the SIM 112 sends the challenge response to the SAT 114. At label 216, the SAT 114 sends the challenge response to the application 116. At label 218, the application 116 sends the challenge response to the access domain 104. At label 220, the access domain 104 sends the challenge response to the operator domain 108. At label 222, the operator domain 108 inspects the challenge response and determines whether the challenge response has successfully passed the challenge. The processing of label 222 may comprise the operator domain 108 or the HSS 126 performing an algorithm on the random number value contained in the authentication challenge using the shared secret key associated with the SIM 112 to create a first authentication value. The operator domain 108 or the HSS 126 then compares the challenge response received from the application 116 to the authentication value. If there is a match, the electronic device 102 or IoT device 170 is deemed authenticated.

At label 224, the operator domain 108 sends an authentication success message to the access domain 104. At label 228, the access domain 104 sends an authentication success message to the application 116. In an embodiment, the authentication success message may indicate that the electronic device 102 or the IoT device 170 is granted access to the access domain 104 and hence to the network 106. In an embodiment, the operator domain 108 may generate a session key at label 222 and return this session key to the access domain 104 (e.g., to the access controller 120 and/or to the access domain 104) in the authentication success message.

At label 212, the SIM 112 may further generate a session key and provide this session key to the SAT 114. The SIM 112 may generate the session key based at least in part on the shared secret key associated with the SIM 112. During communication between the application 116 and the access domain 104, the access domain 104 may challenge the application 116 to provide the access key. In response, the application 116 may request the access key from the SAT 114. The SAT 114 may look the access key up in a transitory memory and return the access key to the application 116. The application 116 may then send the access key to the access domain 104. It is noted that the access key is a derived key and cannot be analyzed to discover the shared secret key retained only by the SIM 112 and by the operator domain 108 (e.g., by the HSS 126 and/or by the operator domain AAA 124). While a cyber threat may hack the transient memory in which the access key is stored, the damage that may be caused by this breach can be mitigated by the access domain 104 periodically aging out session keys and causing the application 116 to re-authenticate following the message sequence 190. The cyber threat may attempt to discover the shared secret key stored in the SIM 112, but this is a considerably more difficult nut to crack, as it were. The SIM 112 can restrict access to its operations and may, for example, never divulge the shared secret key but only derived keys which cannot be analyzed to discover the shared secret key.

Turning now to FIG. 7, another message sequence 236 is described. The message sequence 236 relates to authentication of the application 116 for access to services provided by the service domain 110, for example for sending data captured from the sensor 152 to the application server 132. This may be referred to as application level authentication or layer 7 authentication.

At label 236, the application 116 sends a service request comprising the globally unique identity associated with the SIM 112 to the service domain 110. The processing of label 236 may comprise the application 116 requesting the globally unique identity from the SAT 114 and the SAT 114 looking up the globally unique identity, for example as described above with reference to label 194 of FIG. 6. The sending of the service request from the application 116 to the service domain 110 may involve the access domain 104 confirming that the electronic device 102 or the IoT device 170 is authorized for network layer access, for example by confirming the presence of a valid access key in the service request or through an access challenge exchange with the electronic device 102 or the IoT device 170.

At label 240, the service domain 110 sends an authentication request comprising the globally unique identity to the operator domain 108. In an embodiment, the processing of label 240 may comprise the service domain AC 128 requesting the service domain AAA server 130 to authenticate the globally unique identity and the service domain AAA server 130 sending the authentication request with the globally unique identity to the operator domain 108. At label 242, the operator domain 108 authenticates the globally unique identity. The processing of label 242 may comprise the operator domain AAA server 124 looking up information associated with the SIM 112 associated with the globally unique identity, determining that the SIM 112 is already authenticated, and generating an application key based on the shared secret key associated with the SIM 112. At label 244, the operator domain 108 sends an application authenticated response containing the application key to the service domain 110. In an embodiment, the processing of label 244 comprises the operator domain 108 sending the application authenticated response to the service domain AAA server 130, the service domain AAA server sending the application authenticated response and application key to the service domain AC 128, and the service domain AC 128 commanding the service domain application server 132 to establish a service session with the application 116. At label 246, the service domain 110 sends a payload containing methods and/or APIs for accessing methods supported by the service domain application server 132 to the application 116. At label 248, a datagram transport layer security (DTLS) communication session is established between the application 116 and the service domain application server 132 based at least, in part, on the application key.

The application 116 may be challenged by the service domain application server 132 and/or by the access domain AC 128 to provide the application key. In this case, the application 116 may request the application key from the SAT 114. In an embodiment, the SIM 112 may generate an application key corresponding to the application key generated by the operator domain 108 based on an identity of the service domain application server 132 (e.g., a URI of the application server 132) and based on the shared secret key associated with the SIM 112. The SIM 112 can provide this application key to the SAT 114, and the SAT 114 may store the application key in transient memory. When the application 116 asks the SAT 114 for the application key, the SAT 114 looks up the application key in transient memory and returns it to the application 116. Alternatively, the SAT 114 may return the application key to the application 116 once, and the application 116 may store the application key in transient memory accessible to the application 116.

The application key is a derived key that cannot be analyzed to discover the shared secret key associated with the SIM 112. While a cyber threat may hack the transient memory in which the application key is stored, the damage that may be caused by this breach can be mitigated by the service domain 110 periodically aging out application keys and causing the application 116 to re-authenticate following the message sequence 236. As indicated above with reference to FIG. 6, the SIM 112 can restrict access to its operations and may never divulge the shared secret key but only derived keys which cannot be analyzed to discover the shared secret key.

Turning now to FIG. 8, a method 250 is described. In an embodiment, the method 250 is a method of authenticating access of an electronic device to an application server based on a subscriber identity module (SIM) associated with the electronic device. At block 252, the method 250 comprises receiving an identity request from an application executing on an electronic device by a subscriber identity module application toolkit (SAT) executing on the electronic device. At block 254, the method 250 comprises looking up a device identity by the SAT.

At block 256, the method 250 comprises transmitting the device identity to the application by the SAT. At block 258, the method 250 comprises receiving an authentication challenge from the application by the SAT, where the authentication challenge comprises a random number and an authentication value generated based on the device identity by an authentication authorization accounting (AAA) server located in an operator domain.

At block 260, the method 250 comprises transmitting the random number and the authentication value to a subscriber identity module (SIM) of the electronic device by the SAT. At block 262, the method 250 comprises receiving a response from the SIM by the SAT. At block 264, the method 250 comprises transmitting an authentication response to the application by the SAT, where the authentication response comprises the response received from the SIM.

At block 266, the method 250 comprises generating an application key by the SAT based at least in part on the response received from the SIM. At block 268, the method 250 comprises transmitting the application key to the application by the SAT, whereby the application executing on the application device establishes a communication session with an application server via an access communication network.

Figure 9A:
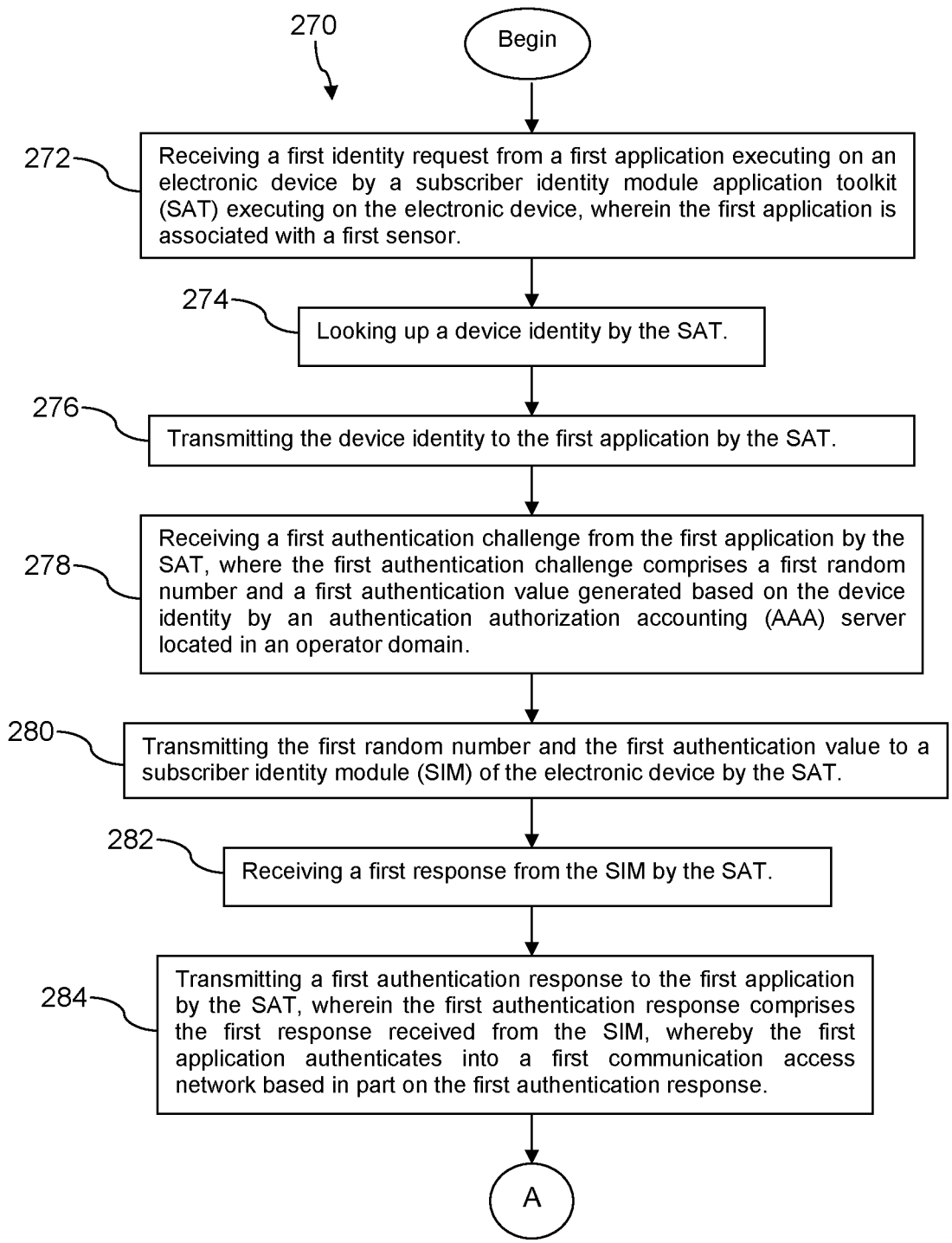
FIG. 9A and FIG. 9B is a flow chart of another method according to an embodiment of the disclosure.
Figure 9B:
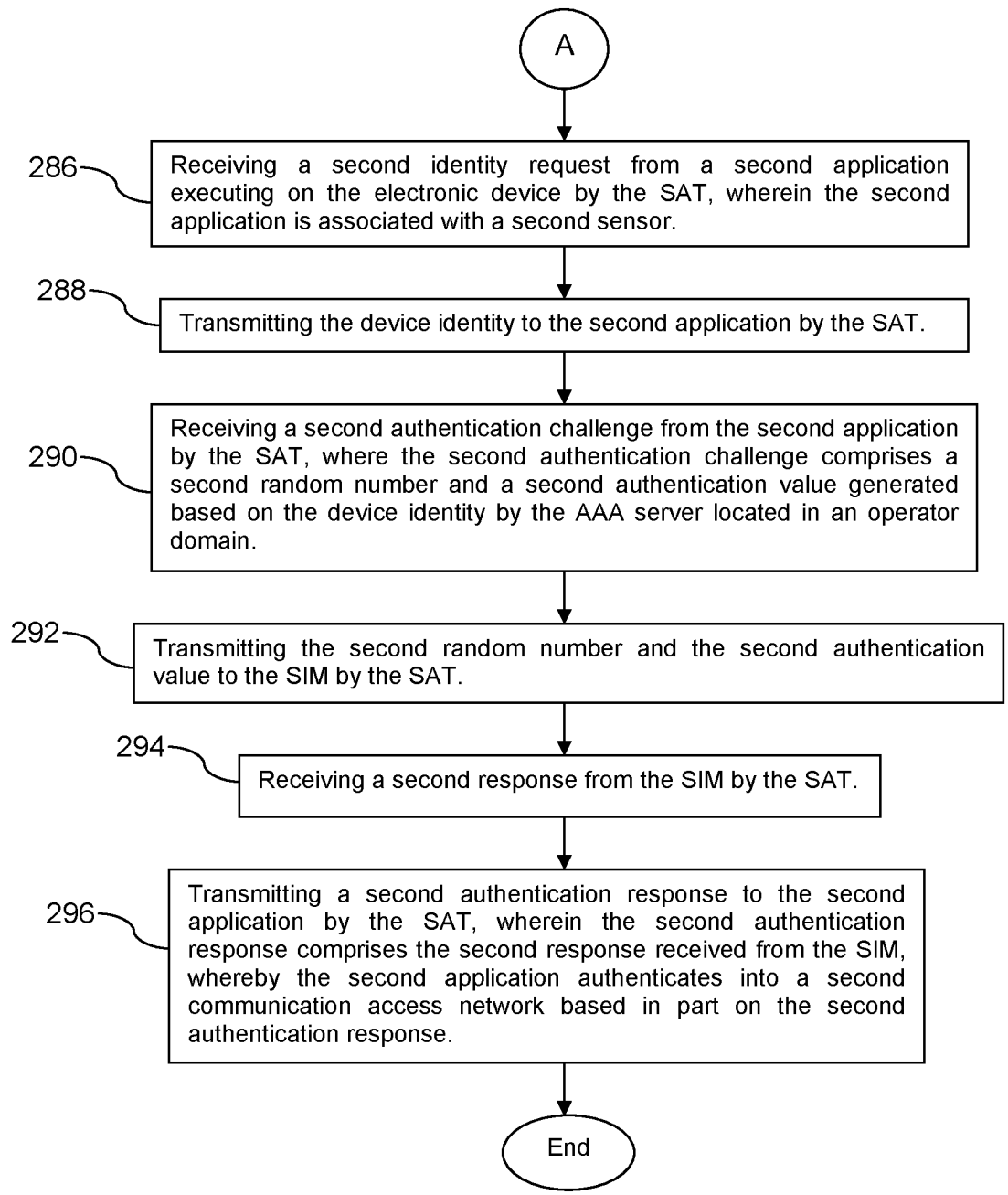

Turning now to FIG. 9A and FIG. 9B, a method 270 is described. In an embodiment, the method 270 is a method of authenticating access of an electronic device into a communication access network based on a subscriber identity module (SIM) associated with the electronic device. At block 272, the method 270 comprises receiving a first identity request from a first application executing on an electronic device by a subscriber identity module application toolkit (SAT) executing on the electronic device, wherein the first application is associated with a first sensor. At block 274, the method 270 comprises looking up a device identity by the SAT. At block 276, the method 270 comprises transmitting the device identity to the first application by the SAT.

At block 278, the method 270 comprises receiving a first authentication challenge from the first application by the SAT, where the first authentication challenge comprises a first random number and a first authentication value generated based on the device identity by an authentication authorization accounting (AAA) server located in an operator domain. At block 280, the method 270 comprises transmitting the first random number and the first authentication value to a subscriber identity module (SIM) of the electronic device by the SAT.

At block 282, the method 270 comprises receiving a first response from the SIM by the SAT. At block 284, the method 270 comprises transmitting a first authentication response to the first application by the SAT, wherein the first authentication response comprises the first response received from the SIM, whereby the first application authenticates into a first communication access network based in part on the first authentication response. In an embodiment, the first application communicates with the first communication access network via a first communication interface of the electronic device.

At block 286, the method 270 comprises receiving a second identity request from a second application executing on the electronic device by the SAT, wherein the second application is associated with a second sensor. At block 288, the method 270 comprises transmitting the device identity to the second application by the SAT.

At block 290, the method 270 comprises receiving a second authentication challenge from the second application by the SAT, where the second authentication challenge comprises a second random number and a second authentication value generated based on the device identity by the AAA server. At block 292, the method 270 comprises transmitting the second random number and the second authentication value to the SIM of the electronic device by the SAT.

At block 294, the method 270 comprises receiving a second response from the SIM by the SAT. At block 296, the method 270 comprises transmitting a second authentication response to the second application by the SAT, wherein the second authentication response comprises the second response received from the SIM, whereby the second application authenticates into a second communication access network based in part on the second authentication response. In an embodiment, the second application communicates with the second communication access network via a second communication interface of the electronic device.

Figure 10:
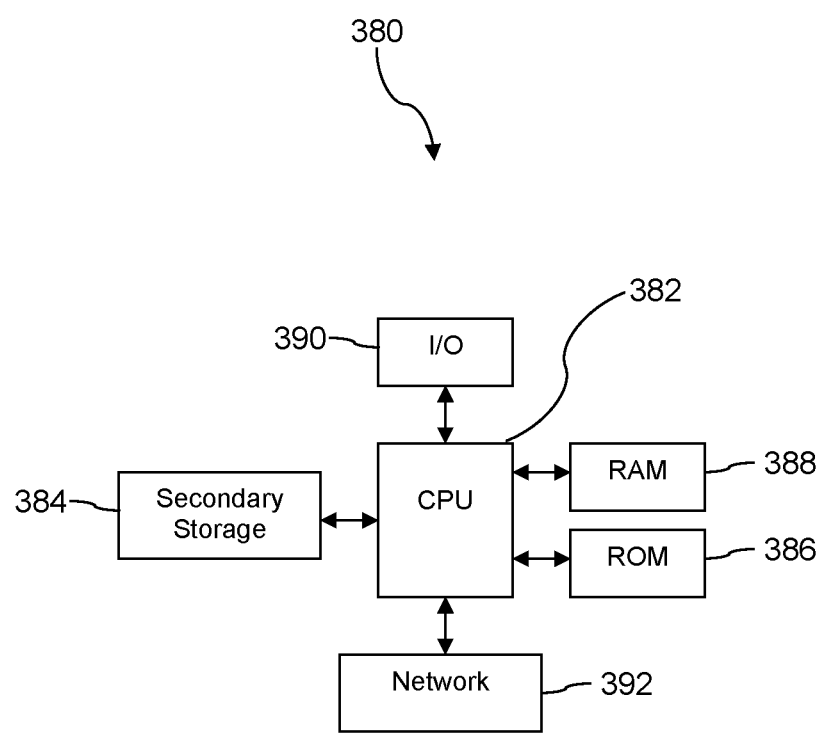
FIG. 10 is a block diagram of a computer system according to an embodiment of the disclosure.

In an embodiment, the method 270 further comprises generating a first application key by the SAT based at least in part on the first response received from the SIM and transmitting the first application key to the first application by the SAT, whereby the first application executing on the electronic device establishes a communication session with a first application server via the first communication access network. In an embodiment of the method 270 further comprises generating a second application key by the SAT based at least in part on the second response received from the SIM and transmitting the second application key to the second application by the SAT, whereby the second application executing on the electronic device establishes a communication session with a second application server via the second communication access network;

FIG. 10 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of authenticating access of an electronic device to an application server based on a subscriber identity module (SIM) associated with the electronic device, comprising:
    receiving an identity request from an application executing on an electronic device by a subscriber identity module application toolkit (SAT) executing on the electronic device;
    looking up a device identity by the SAT;
    transmitting the device identity to the application by the SAT;
    receiving an authentication challenge from the application by the SAT, where the authentication challenge comprises a random number and an authentication value generated based on the device identity by an authentication authorization accounting (AAA) server located in an operator domain;
    transmitting the random number and the authentication value to a subscriber identity module (SIM) of the electronic device by the SAT;
    receiving a response from the SIM by the SAT;
    transmitting an authentication response to the application by the SAT, where the authentication response comprises the response received from the SIM;
    generating an application session key by the SAT based at least in part on the response received from the SIM; and
    transmitting the application session key to the application by the SAT, whereby the application executing on the electronic device establishes a communication session with an application server via an access communication network.

2. The method of claim 1, wherein the electronic device is an Internet of things (IoT) device.

3. The method of claim 2, wherein the application sends sensor data collected from a sensor of the electronic device to the application server.

4. The method of claim 1, wherein the electronic device is one of a mobile phone, a smart phone, a wearable computer, a laptop computer, a tablet computer, or a notebook computer.

5. The method of claim 1, wherein the application communicates with the access communication network via a non-cellular communication link.

6. The method of claim 5, wherein the application communicates with the access communication network via one of a WiFi wireless communication link, a Bluetooth wireless communication link, an Ethernet communication link, and a power line communication (PLC) communication link.

7. The method of claim 5, wherein the SAT executes on a cellular radio modem of the electronic device.

8. An electronic device, comprising:
    a communication interface;
    a subscriber identity module (SIM);
    an application stored in a non-transitory memory of the electronic device that, when executed by a processor of the electronic device, authenticates into an access communication network and authenticates into an application service domain via the communication interface; and
a SIM application toolkit stored in a non-transitory memory of the electronic device that, when executed by a processor of the electronic device
receives an identity request from the application, wherein the identity request is associated with the application authenticating into the access network,
looks up a device identity,
transmits the device identity to the application,
receives an authentication challenge from the application, wherein the authentication challenge comprises a random number and an authentication value generated based on the device identity by an authentication authorization accounting (AAA) server located in an operator domain and wherein the authentication challenge is associated with the application authenticating into the access network,
transmits the random number and the authentication value to the SIM,
receives a response from the SIM,
transmits an authentication response to the application, where the authentication response comprises the response received from the SIM,
generates an application key based at least in part on the response received from the SIM, and
transmits the application key to the application, whereby the application authenticates into the application service domain and establishes a communication session with an application server in the application service domain via the communication interface.

9. The electronic device of claim 8, wherein the electronic device is an Internet of things (IoT) device.

10. The electronic device of claim 8, wherein the electronic device is one of a mobile phone, a smart phone, a wearable computer, a laptop computer, a tablet computer, or a notebook computer.

11. The electronic device of claim 8, wherein the communication provides one of a WiFi wireless communication link, a Bluetooth wireless communication link, an Ethernet wired communication link, and a power line communication (PLC) communication link to the access communication network.

12. The electronic device of claim 8, wherein the electronic device further comprises a sensor coupled to the processor on which the application executes, wherein the application collects data from the sensor and transmits data associated with the sensor to the application service domain.

13. The electronic device of claim 8, wherein the electronic device further comprises a plurality of sensors coupled to the processor on which the application executes, wherein the application collects data from each of the sensors and transmits data associated with the sensors to the application service domain.

14. The electronic device of claim 8, wherein the application and the SIM application toolkit execute on the same processor of the electronic device.

15. The electronic device of claim 8, wherein the application executes on a first processor of the electronic device and the SIM application toolkit executes on a second processor of the electronic device.

16. A method of authenticating access of an electronic device into a communication access network based on a subscriber identity module (SIM) associated with the electronic device, comprising:

receiving a first identity request from a first application executing on an electronic device by a subscriber identity module application toolkit (SAT) executing on the electronic device, wherein the first application is associated with a first sensor;
looking up a device identity by the SAT;
transmitting the device identity to the first application by the SAT;
receiving a first authentication challenge from the first application by the SAT, where the first authentication challenge comprises a first random number and a first authentication value generated based on the device identity by an authentication authorization accounting (AAA) server located in an operator domain;
transmitting the first random number and the first authentication value to a subscriber identity module (SIM) of the electronic device by the SAT;
receiving a first response from the SIM by the SAT; and
transmitting a first authentication response to the first application by the SAT, wherein the first authentication response comprises the first response received from the SIM, whereby the first application authenticates into a first communication access network based in part on the first authentication response;
receiving a second identity request from a second application executing on the electronic device by the SAT, wherein the second application is associated with a second sensor;
transmitting the device identity to the second application by the SAT;
receiving a second authentication challenge from the second application by the SAT, where the second authentication challenge comprises a second random number and a second authentication value generated based on the device identity by the AAA server;
transmitting the second random number and the second authentication value to the SIM of the electronic device by the SAT;
receiving a second response from the SIM by the SAT; and
transmitting a second authentication response to the second application by the SAT, wherein the second authentication response comprises the second response received from the SIM, whereby the second application authenticates into a second communication access network based in part on the second authentication response.

17. The method of claim 16, further comprising:
generating a first application key by the SAT based at least in part on the first response received from the SIM;
transmitting the first application key to the first application by the SAT, whereby the first application executing on the electronic device establishes a communication session with a first application server via the first communication access network;
generating a second application key by the SAT based at least in part on the second response received from the SIM; and
transmitting the second application key to the second application by the SAT, whereby the second application executing on the electronic device establishes a communication session with a second application server via the second communication access network.

18. The method of claim 17, wherein the first application key is generated by the SAT at least in part on a uniform resource identity (URI) of the first application server and the second application key is generated by the SAT at least in part on a URI of the second application server.

19. The method of claim 16, wherein the first sensor is one of a temperature sensor, a humidity sensor, a magnetic sensor, a pressure sensor, a gas detection sensor, and a flow sensor.

20. The method of claim 16, wherein the first application communicates with the first communication access network via a first communication interface of the electronic device and the second application communicates with the second communication access network via a second communication interface of the electronic device.

* * * * *